F. P. GLADFELTER.
Gate.
No. 213,187. Patented Mar. 11, 1879.
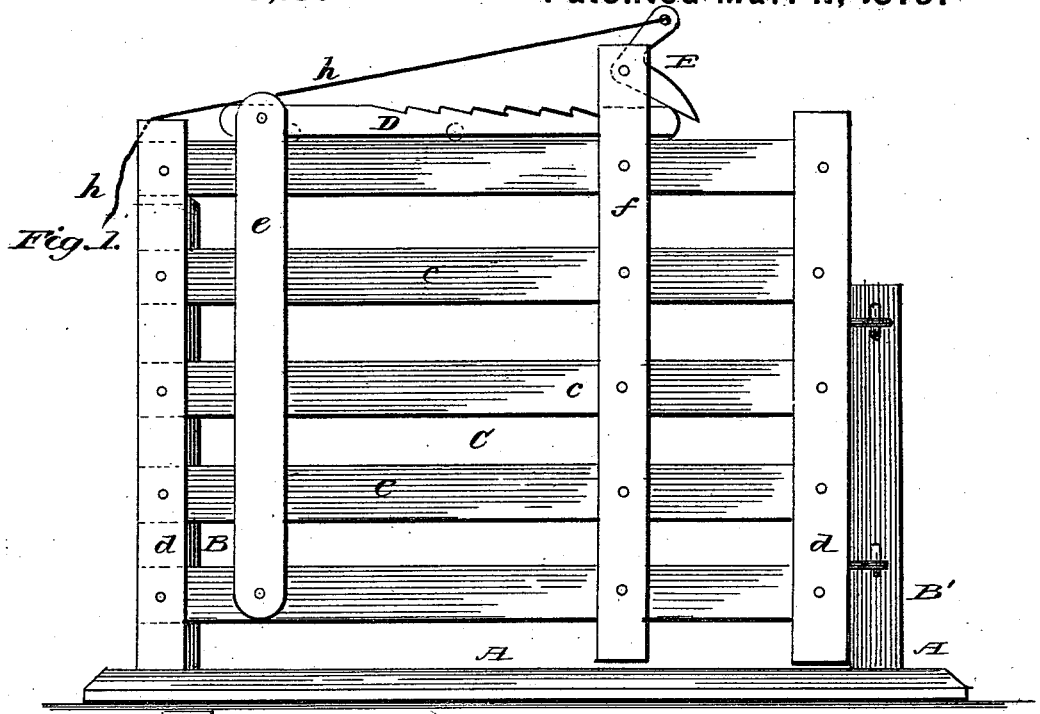
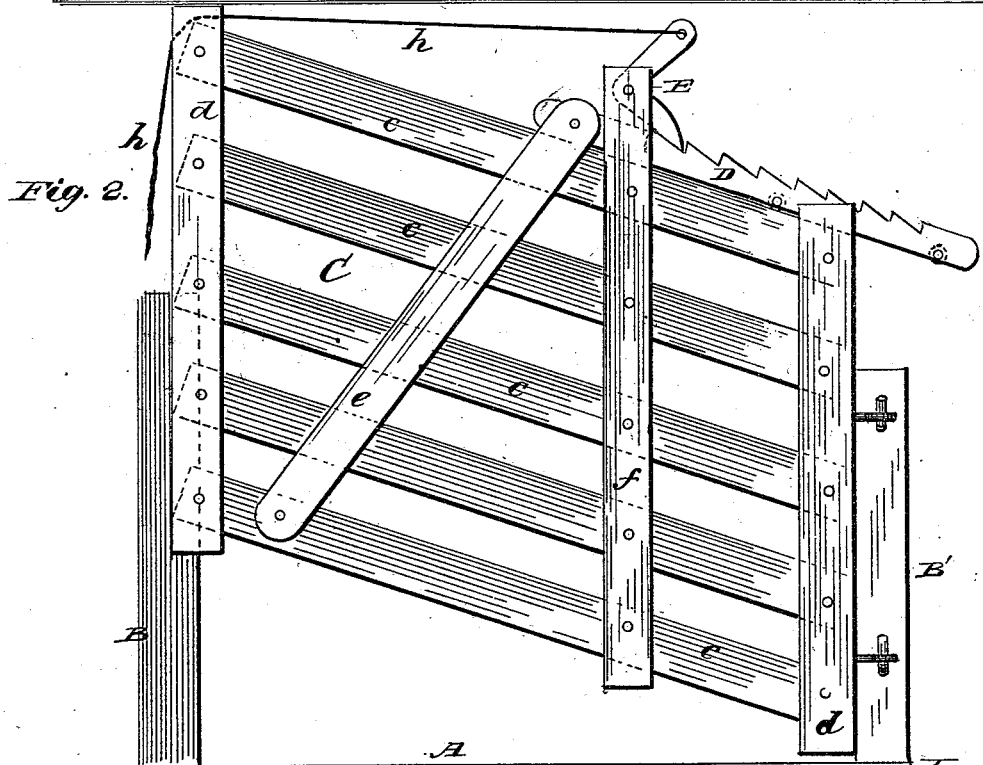
Witnesses
Fred G. Dieterich
George Binkenburg
Inventor
Frank P. Gladfelter
by Louis Bagger & Co.
Attorneys

UNITED STATES PATENT OFFICE.

FRANK P. GLADFELTER, OF WEST CANAAN, OHIO.

IMPROVEMENT IN GATES.

Specification forming part of Letters Patent No. 213,187, dated March 11, 1879; application filed December 27, 1878.

*To all whom it may concern:*

Be it known that I, FRANK P. GLADFELTER, of West Canaan, in the county of Madison and State of Ohio, have invented certain new and useful Improvements in Gates; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved stock and farm gate; and Fig. 2 is a similar view, showing the gate elevated at its forward end.

The same part in the two figures is denoted by the same letter.

This invention relates to certain improvements in gates, particularly that class termed "farm" or "stock" gates; its object being to enable the elevating of the forward end thereof.

To this end it consists in the connecting of the lower rail of the gate, by suitable means, to a sliding serrated or notched bar or rack, arranged upon the upper rail of the gate, and engaged by a pawl, substantially as hereinafter more fully set forth.

In the annexed drawings, A refers to the ground-sill, in the event one is used, and into which, in the present instance, the posts B B' are inserted, instead of which, however, they may be planted into the ground.

C is the gate, whose slats or longitudinal pieces $c\ c$ are pivoted at their ends between upright parallel side pieces $d\ d$.

The gate is hung in position upon one of the posts B B', in the ordinary manner, by hook and staple, hinges, or any other kind of hinged attachment.

D is a serrated or toothed bar or rack, pivoted or connected to and between parallel pieces $e$, reaching down and connecting with the bottom rail or slat of the gate, to which they are pivoted, to permit of their having a limited movement in the direction of the length of the gate, to enable the rack D to have a similar movement. This rack slides upon the top rail or slat of the gate between the upwardly-projecting ends of parallel bars or pieces $f$, between which and the end pieces $d\ d$ the several slats of the gate are all pivoted, to admit of the independent vertical movement of each slat, rendering the gate in itself susceptible of being elevated at one end— its unhinged or forward end.

Between the upper ends of the side or parallel pieces $f$ is hung a pawl, E, engaging with the rack D, from which pawl extends a rope or cord, $h$, or its equivalent, reaching down within convenient reach of the operator.

The operation of my improved gate is as follows: For elevating the forward end of the gate to permit the smaller-sized animals to pass in and out without granting the larger ones or stock the same privilege, the said end of gate is lifted to the desired height, when, it will be observed, the rack D will slide down the top slat or rail, the pawl not engaging therewith to hold it back until upward pressure has been removed and the gate ceased to be lifted, at which instant the pawl will catch into the rack, and thus hold the gate in its elevated position, as shown in Fig. 2.

To lower the gate, it is only necessary to pull on the cord $h$, when the pawl will be instantly disengaged from the rack D, and the gate allowed to fall or return to its original position.

This gate is exceedingly simple and easily constructed, and costs but little more to manufacture than an ordinary gate.

Having thus fully described my invention, I claim and desire to secure by Letters Patent of the United States—

As an improvement in gates, the combination of the parallel slats $c$, pivoted in end pieces $d\ d$, cross-pieces $e\ f$, pivoted sliding rack D, cranked pawl E, and operating-cord $h$, all constructed and combined to operate substantially as set forth, for the purpose described.

In testimony that I claim the foregoing as my own I have hereunto affixed my signature in presence of two witnesses.

FRANK P. GLADFELTER.

Witnesses:
 W. P. ANDREW,
 M. WORTHINGTON.